US010248896B2

(12) United States Patent
Gao et al.

(10) Patent No.: US 10,248,896 B2
(45) Date of Patent: Apr. 2, 2019

(54) DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY

(71) Applicant: Datalogic USA, Inc., Eugene, OR (US)

(72) Inventors: WenLiang Gao, Eugene, OR (US); Alan Shearin, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 81 days.

(21) Appl. No.: 15/623,108

(22) Filed: Jun. 14, 2017

(65) Prior Publication Data
US 2018/0365544 A1 Dec. 20, 2018

(51) Int. Cl.
*G06K 7/14* (2006.01)
*G06K 19/06* (2006.01)
*G06F 13/42* (2006.01)
*G06K 7/10* (2006.01)

(52) U.S. Cl.
CPC ... *G06K 19/06028* (2013.01); *G06F 13/4282* (2013.01); *G06K 7/10722* (2013.01); *G06K 7/1413* (2013.01)

(58) Field of Classification Search
CPC ........... G06K 7/10851; G06K 7/10732; G06K 7/10722; G06K 7/10881
USPC ................................ 235/454, 462.01–462.49
See application file for complete search history.

(56) References Cited

U.S. PATENT DOCUMENTS

| | | | | |
|---|---|---|---|---|
| 4,855,581 A * | 8/1989 | Mertel | ..................... | G06K 7/14 235/462.07 |
| 6,003,775 A | 12/1999 | Ackley | | |
| 6,328,214 B1 * | 12/2001 | Akel | .................. | G06K 7/10722 235/462.1 |
| 8,430,318 B2 | 4/2013 | McQueen et al. | | |
| 8,474,715 B2 | 7/2013 | Goncalves | | |
| 8,794,526 B2 | 8/2014 | Wang et al. | | |
| 9,004,359 B2 | 4/2015 | Shearin et al. | | |
| 9,152,835 B2 | 10/2015 | Meier et al. | | |
| 2012/0293680 A1 | 11/2012 | Guan | | |
| 2014/0097251 A1 * | 4/2014 | Joussen | ................ | G06K 7/1404 235/462.07 |

OTHER PUBLICATIONS

Datalogic ADC, Inc., "MagellanTM 9800i", http://www.datalogic.com/Download?path=%2fupload%2fmarketlit%2fdatasheets%2fDS-MAGELLAN9800i-EN.pdf&iddwnfile=16382&name=Magellan+9800i+%7e+English+LTR, Aug. 12, 2015, 2 pages.
Datalogic Automation S.r.l., "MX-E Series", http://www.datalogic.com/Download?path=%2fupload%2fia%2ffile_masters%2fGC-Vision-ENUS_2015.pdf&iddwnfile=16475&name=DS-MX_E-ENUS&pageRange=69-78&master=true, Jan. 20, 2016, 10 pages.

(Continued)

*Primary Examiner* — Jamara Franklin
(74) *Attorney, Agent, or Firm* — Stoel Rives LLP; Robert R. Teel

(57) ABSTRACT

An optical code reader includes centralized decoding circuitry communicatively couplable to an expandable set of camera modules placed at spaced-apart locations of the optical code reader. A number of and locations for members of the expandable set of camera modules establish application-specific and scalable read zone coverage formed from multiple fields of view of the members.

19 Claims, 8 Drawing Sheets

(56) References Cited

OTHER PUBLICATIONS

Datalogic S.p.A., "MX-U Series", http://www.datalogic.com/Download?path=%2fupload%2fia%2ffile_masters%2fGC-Vision-ENUS_2015.pdf&iddwnfile=15176&name=DS-MX_U-ENUS&pageRange=41-44&master=true, Jan. 20, 2017, 4 pages.

FLIR Integrated Imaging Solution, "Stereo Vision Introduction and Applications", http://www.ptgrey.com/support/downloads/10353, Jan. 31, 2017, 5 pages.

Omnivision Technologies, Inc., "OV9281-OV9282 1-megapixel Product Brief", www.ovt.com/download/sensorpdf/206/OmniVision_OV9281.pdf, Dec. 2016 2 pages.

\* cited by examiner

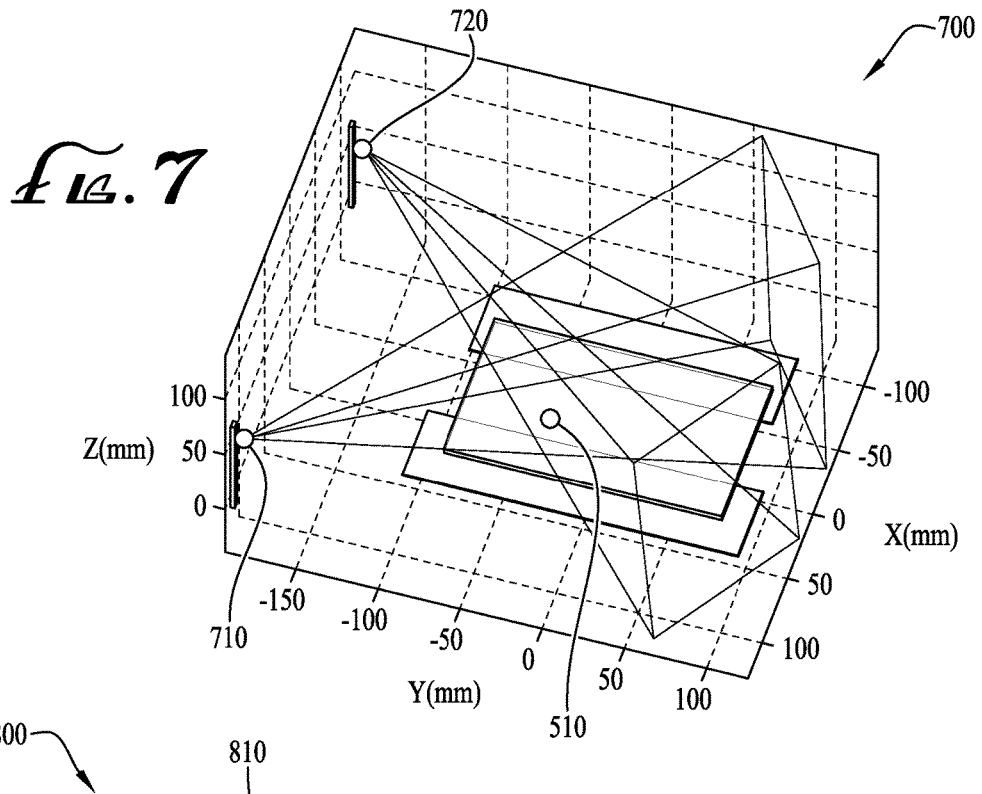
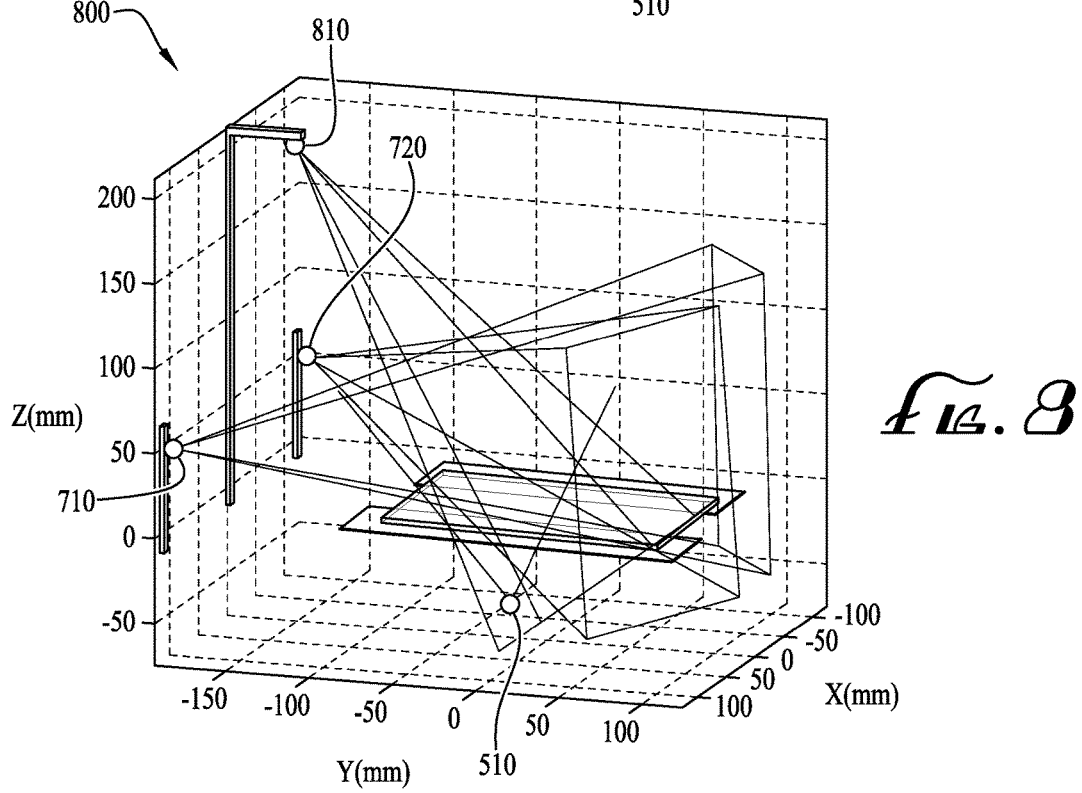

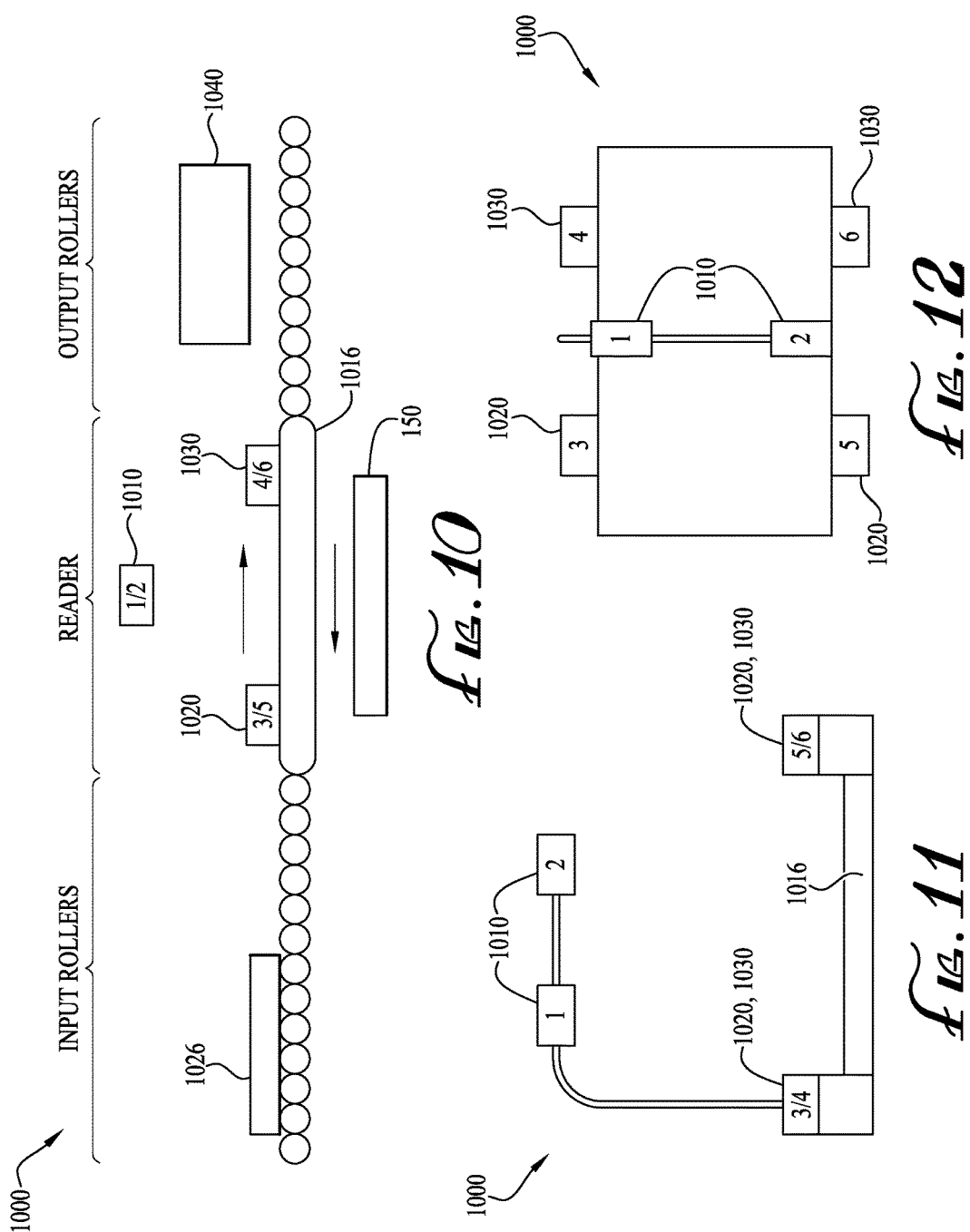

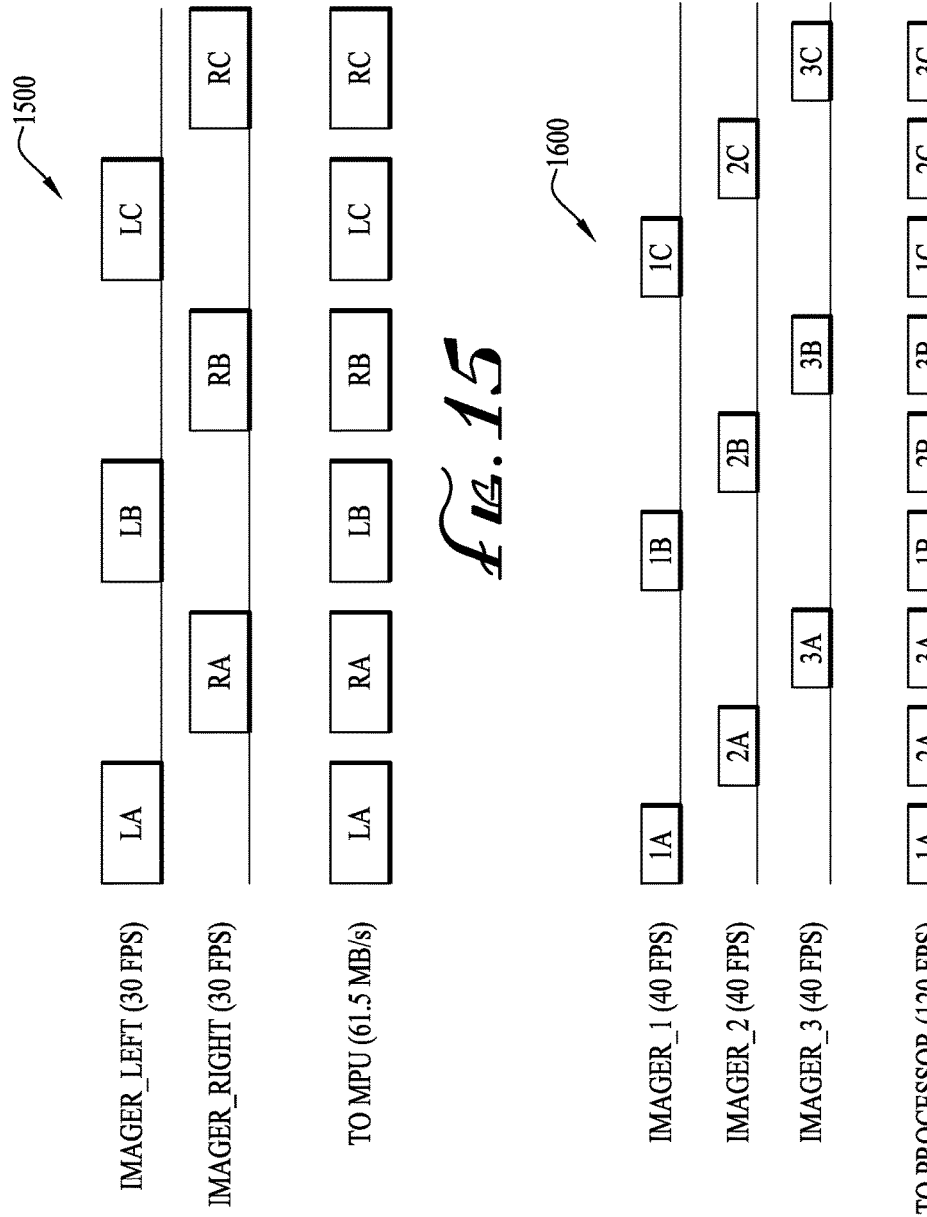

DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY

TECHNICAL FIELD

The field of this disclosure relates generally to imager-based optical code readers and, more particularly, to readers having multiple imagers forming a read volume established from each imager's field-of-view (FOV).

BACKGROUND INFORMATION

There are many types of optical codes characterized by various symbologies, including one-dimensional (1-D) barcodes, such as a Universal Product Code (UPC) and EAN/JAN codes; stacked codes, such as PDF417; and two-dimensional (2-D) codes, such as Maxicode codes. In generally, optical codes have widespread applicability in identifying a class of items (e.g., merchandise) or unique items (e.g., patents).

Optical codes are found on a wide variety of items and objects, such as retail goods, company assets, and documents that are read—or scanned, in some cases—by optical code readers to help track item movement in industrial or shipping facilities or to monitor sales and inventory at retail establishments. For example, optical codes are placed on or associated with items, packages, containers, or other objects read by an optical code reader when the items bearing the optical codes are passed through a read zone (described below) during a data-reading operation. In a more specific retail store example, optical code readers (and perhaps other types of data readers) are integrated in a checkstand counter and generally form one or more read volumes (or scan volumes) combining to establish the read zone in which optical codes may be successfully read.

A read zone encompasses one or more read volumes, the extent of which are typically defined by the FOV and a depth-of-field (DOF) of one or more associated imaging devices. Also, an FOV for each imager may be subdivided into several sub-views using optical elements that provide several perspectives for a single imager. Therefore, for purposes of this description, the interchangeable terms read volume and FOV mean any and all divided and undivided perspectives associated with an imager (or scanner). Furthermore, a read zone means a three-dimensional region formed from any and all read volumes that may or may not partially overlap.

There are two principal types of optical code reader technologies used to acquire data associated with an optical code: laser scanner and imager-based optical code (or simply, imaging) reader technologies. Laser scanners can read 1-D barcodes over greater distances and at lower illumination levels compared to imaging counterparts, whereas imaging readers have advantages over their laser-based counterparts in that laser scanner technologies typically are less effective at reading unreflective surfaces (e.g., display screens) and complex 2-D optical code symbologies such as QR code and Datamatrix. In other words, imagers do not scan and are capable of reading more complex codes or biometric items by employing a camera—i.e., optics and associated imaging circuitry, such as a charge coupled device (CCD) or complementary metal oxide semiconductor (CMOS) device—to receive light reflected from an optical code and thereby generate electronic image data (e.g., conveyed in digital form as an image frame) representing the optical code. The image data is then processed to locate and decode the optical code.

Notwithstanding the technical differences between laser scanners and imaging readers, they both are referred to generally as data readers or simply, readers. For purposes of this disclosure, the terms scan and read, as well as derivatives of these terms, should be appreciated by skilled persons as being interchangeable in the context of imager-based scanning (reading) systems. Thus, the terms scan and read generally connote acquiring data associated with an optical code. Likewise, the terms scanner and imaging reader connote devices used to acquire data associated with an optical code.

Some specific examples of imaging readers include those of the Magellan™ series available from Datalogic USA, Inc. of Eugene, Oreg., the assignee of this patent application, and the MP6000 scanner/scale available from Zebra Technologies Corporation of Lincolnshire, Ill.

SUMMARY OF THE DISCLOSURE

Systems of the present disclosure are flexible, configurable, and scalable to meet different customer needs. The disclosed techniques provide for optionally adding camera modules in communication with a field-programmable gate array (FPGA)-based decoding controller board that multiplexes image data from serial differential signal paths of different camera modules into a parallel data stream, thereby presenting the serial data stream to a common processor communicatively coupled to the FPGA. These techniques allow for readily adding optional imagers so as to cover additional fields of view. In other words, a user can tailor a system based on particular scanning needs rather than buying a one-size-fits-all (expensive, fixed) platform. The disclosed system, therefore, has the capability of satisfying different customers' needs (from existing single plane scanner to bi-optic scanner and more).

Disclosed are techniques by which to separate camera modules from processing resources so as to provide the following six advantages. First, the system provides for a flexible system configuration. Second, the system facilitates a flexible optical design through camera modules mountable at remote locations (up to several meters away) based on application-specific tasks such as 2-D decoding, 3-D spatial imaging, Visual Pattern Recognition (ViPR) and other applications. Third, the system provides for a reduction of redundant image-data processing through multiplexing of image data streams. Fourth, the system facilitates allocation of decoder resources based on nominal content of image data streams, e.g., for lower processing-load-causing imagers (such as customer-facing scanners), multiplexing a greater number of imagers to fewer processors, and for higher processing-load-causing imagers, multiplexing an imager to multiple processors that each perform a separate decoding task (e.g., 1-D, 2-D, and digital watermark data decoding). Fifth, the system provides for load balancing of a given processing resource by multiplexing to it multiple image data streams typically causing low and high (i.e., different) processing loading. Sixth, the system may be implemented at reduced cost attributable to direct Mobile Industry Processor Interface (MIPI) Camera Serial Interface (CSI) (e.g., twisted-wire serial) signal connections, i.e., avoiding parallel-to-serial data conversion preparatory to a relatively long-distance transmission to a centralized processing resource.

In a first example, an optical code reader has centralized decoding circuitry communicatively couplable to an expandable set of camera modules placed at spaced-apart locations of the optical code reader, with a number of and locations for members of the expandable set of camera modules establishing application-specific and scalable read zone coverage formed from multiple FOVs of the members, and the centralized decoding circuitry having multiple serial interfaces and a preprocessor-and-processor pair; a first camera module of the expandable set of camera modules having a first imager and a first serial interface for communicating first image data generated by the first imager according to a first data rate, the first serial interface being integral to the first imager; a second camera module of the expandable set of camera modules, spaced apart from the first camera module, having a second imager and a second serial interface for communicating second image data generated by the second imager according to the first data rate, the second serial interface being integral to the second imager; the preprocessor-and-processor pair including a preprocessor providing a serial-to-parallel multiplexer of the pair, a processor providing an optical code decoder of the pair, a first set of serial interfaces of the serial-to-parallel multiplexer, and a second set of parallel interfaces; the first set of serial interfaces including third and fourth serial interfaces, the third serial interface serially couplable through a first corresponding serial cable to the first serial interface of the first camera module, the fourth serial interface serially couplable through a second corresponding serial cable to the second serial interface of the second camera module; and the second set of parallel interfaces including a first parallel interface of the serial-to-parallel multiplexer and a second parallel interface of the optical code decoder, the first and second parallel interfaces communicatively coupled to each other for communicating, at a second data rate different from the first data rate, multiplexed image data generated from the first and second image data by the serial-to-parallel multiplexer for conveying the multiplexed image data to the optical code decoder and thereby facilitating its attempt to decode an optical code borne by an item present within the read zone coverage and represented in one or both of the first and second image data.

In a second example, the optical code reader of the first example (or any other example) has a preprocessor comprising an FPGA.

In a third example, the optical code reader of the first example (or any other example) has first and second image data that are image frames generated by, respectively, the first and second camera modules operative at a frame rate corresponding to the first data rate.

In a fourth example, in the optical code reader of the first example (or any other example), the first set of serial interfaces include two or more serial interfaces.

In a fifth example, the optical code reader of the first example (or any other example) includes three or more camera modules.

In a sixth example, the optical code reader of the first example (or any other example) has the preprocessor configured to analyze the first and second image data for the presence or absence of the item.

In a seventh example, the optical code reader of the sixth example (or any other example) has the preprocessor configured to suppress from inclusion in the multiplexed image data at least some portion of the first or second image data.

In an eighth example, the optical code reader of the sixth example (or any other example), has the preprocessor configured to analyze the first and second image data for the presence or absence of a region of interest (ROI) having characteristics indicating the presence or absence of at least a portion of the optical code.

In a ninth example, the optical code reader of the eighth example (or any other example), has the preprocessor configured to suppress from inclusion in the multiplexed image data at least a portion of the first or second image data lacking the ROI.

In a tenth example, the optical code reader of the first example (or any other example) has first, second, third, and fourth serial interfaces that comprise CSIs.

In an eleventh example, the optical code reader of the first example (or any other example) has the preprocessor configured to control image-exposure synchronization between the first and second camera modules.

In a twelfth example, the optical code reader of the eleventh example (or any other example) has the image-exposure synchronization timed for substantially simultaneous exposure so as to generate three-dimensional (3-D) spatial data of the item.

In a thirteenth example, the optical code reader of the twelfth example (or any other example) has the centralized decoding circuitry configured to determine a 3-D location of a feature of the item based on the 3-D spatial data.

In a fourteenth example, a method of configuring an optical code reader platform, for application-specific scalability of a read zone formed from one or more FOVs of camera modules mountable at spaced-apart locations of the optical code reader platform, includes: arranging, based on desired coverage of the read zone, members of a set of camera modules at corresponding spaced-apart locations of the optical code reader platform that are predefined for establishing the one or more FOVs forming the desired coverage of the read zone, each member of the set having an imager including an integral serial interface for communicating image frames from the associated member of the set; providing centralized decoding circuitry including multiple preprocessor-and-processor pairs, each preprocessor of one of the pairs including serial interfaces serially couplable through corresponding serial cabling to corresponding serial interfaces of, respectively, first and second members of the set of camera modules, and each preprocessor of one of the pairs having a parallel interface for a corresponding processor of the pair such that the preprocessor multiplexes first and second image data from, respectively, the first and second members and presents multiplexed image data to the corresponding processor configured to attempt to read an optical code represented in one or both of the first and second image data; and communicatively coupling, through the serial cabling, the serial interfaces to establish the application-specific scalability of the optical code reader platform.

In a fifteenth example, the method of the fourteenth example (or any other example) also includes calibrating intrinsic and extrinsic calibration parameters of the members of the set of camera modules to establish at least one stereo pair of camera modules.

In a sixteenth example, the method of the fourteenth example (or any other example) also includes, with reference to the communicatively coupling, coupling two or more camera modules to each preprocessor.

In a seventeenth example, the method of the fourteenth example (or any other example) also includes, with reference to the arranging, seating at least one camera module in a fruit rail of an optical code reader.

In an eighteenth example, the method of the fourteenth example (or any other example) also includes, with reference to the arranging, mounting six camera modules.

In a nineteenth example, the method of the fourteenth example (or any other example) also includes providing a parallel electrical connection, between the preprocessor and the processor, that is about 10 millimeters (mm) or less in length.

Additional aspects and advantages will be apparent from the following detailed description of preferred embodiments, which proceeds with reference to the accompanying drawings.

BRIEF DESCRIPTION OF THE DRAWINGS

FIGS. 5-9 are orthographic optical coverage diagrams for optical code readers having, respectively, one, two, three, four, and six camera modules spaced apart at selectable mounting locations of an optical code reader (not shown).

FIGS. 10-12 are, respectively, side elevation, front, and top plan views of a self-checkout system having a conveyor and six camera modules for capturing images of items (not shown) transportable by the conveyor.

FIGS. 15 and 16 are timing block diagrams corresponding to an FPGA of, respectively, FIGS. 13 and 14 multiplexing image frames from its corresponding set of camera modules to deliver a multiplexed data stream to its associated MPU (not shown).

DETAILED DESCRIPTION OF EMBODIMENTS

Previous Original Equipment Manufacturers (OEMs) attempted to balance a broad set of competing customer expectations for optical code readers. For example, some customers expect a high degree of ease of use (i.e., user experience), whereas others value low expense and technical complexity.

With reference to ease of use, one consideration impacting user experience is that an end user should not be expected to repetitively reorient an item so as to ensure its barcode is readable within a read zone. For efficient use of an optical code reader, it is desirable to maximize a first-pass read rate by increasing the probability that an item will have its optical code successfully read on a single data-reading sweep across a read zone. Thus, an optical code reader having a complete coverage zone—i.e., six-sided, omnidirectional, 360°—tends to improve this facet of user experience, especially for high-volume checkout lanes and self-checkout systems.

With respect to expense and complexity, however, systems having fewer imagers also have reduced expense and complexity. But those reductions also reduce read zone size and coverage. For users that do not have high volume and fast speed checkout requirements, they might wish to accept less coverage. Other users, however, may wish to cover more read zone such that the likelihood of item reorientation is lessened, and user experience and throughput are improved.

To achieve the aforementioned balance, previous OEMs have developed separate products characterized by specialized (i.e., fixed) optical layouts, camera mounting locations, and predefined read zone coverages. Because previous technologies have been preconfigured by OEMs and developed on separate product roadmaps, these previous attempts lacked a scalable platform capable of accommodating a flexible (greater or lesser) amount of read zone coverage that may be tailored later to address different applications and requirements. In other words, scaling previous platforms entailed adding both imager and image-data processing circuitry—e.g., on a relatively bulky PCB—such that the additional components could communicate over a short-distance (i.e., about 10 mm or less) parallel data interface. This resulted in expensive, decentralized, and often under-utilized (redundant) image-frame processing resources disposed at bulky and sometimes optically suboptimal mounting locations. Other attempts to employ centralized processing resources necessitated low-voltage differential signaling (LVDS) in the form of costly parallel-to-serial interface conversion hardware local to each additional imager communicatively coupled to image-frame processing resources.

Figure 1:
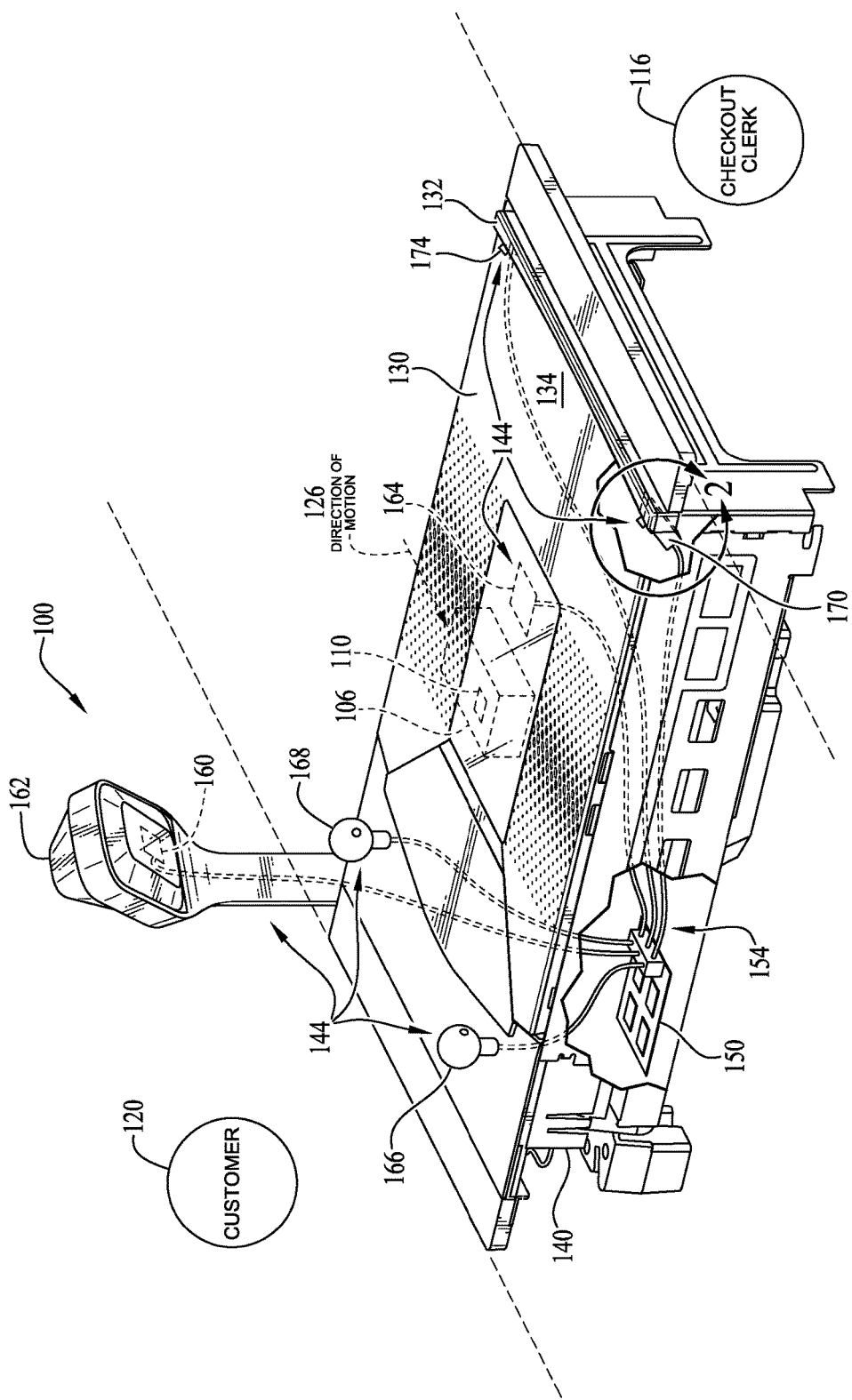
FIG. 1 is a fragmentary isometric view of an optical code reader having a set of camera modules including top-down, base, low-profile (i.e., bonnetless) left and right side, and fruit-rail-mounted left and right side camera modules collectively establishing a six-sided read volume by which to capture image frames conveyed through serial cabling to common, centralized decoding circuitry shown through a removed fragment of the optical code reader.

To facilitate scalable read zone coverage in retail checkout or other applications, relatively low-cost camera modules coupled to a decoder board are described. For example, FIG. 1 shows a multi-plane optical code reader 100, which is a type of reader also referred to as a dual-plane or bi-optic style reader having horizontally and vertically overlapping FOVs. Dual-plane or bi-optic style readers are popular for high-volume applications because they provide multiple overlapping perspectives for obtaining images of several sides of an item 106 bearing an optical code 110. Overlapping perspectives are also generated by optics (e.g., mirrors) that divide a single FOV to produce a non-contiguous or irregular read volume for the associated imaging device.

For discussion purposes, sides of the optical code reader 100 are referred to by corresponding locations of a checkout clerk 116, a customer 120, and a direction of motion 126 of the item 106. The optical code reader 100 is usable without the checkout clerk 116 or the customer 120, and either person can use the optical code reader 100 from any unobstructed location. In addition, the item 106 is described as a box-shaped package for ease of description, but the item 106 may have other shapes consistent with cylindrical cans, fruit and other produce, or irregularly shaped packages, such as a bag of oranges, potato chips, or the like. Furthermore, the direction of motion 126 of the item 106 is illustrated as right-to-left (from the perspective of the checkout clerk 116), but other directions through a read zone (e.g., left-to-right) are equally applicable.

A platter 130 provides a weigh scale surface for the optical code reader 100 operating as a scanner-scale. The platter 130 may include at one or both ends an optional bump, rail, or raised section 132 to inhibit items (e.g., spherical fruit) from rolling or sliding off a surface 134 of the platter 130. In some embodiments, the platter 130 may comprise a structure that is readily removable from a chassis 140 on which are mounted (directly or indirectly) an expandable set of camera modules 144 placed at spaced-apart locations of the optical code reader 100.

A camera is an optical instrument for recording or capturing images, which may be stored locally, transmitted to another location, or both. The images may be individual still photographs or sequences of images constituting videos or movies. Moreover, the cameras of the present disclosure are so-called modules because they are discrete units that may be added to or removed from a common platform so as to accommodate different desired read zone coverages based on application-specific use cases. In other words, camera modules are plug-and-play devices that are readily configurable. As relatively compact modules, the camera modules 144 may be set into fairly small locations, including in the fruit rail 132.

The number of and locations for members of the expandable set of camera modules 144 establish application-specific and scalable read zone coverage formed from multiple FOVs of the members. For example, the expandable set of camera modules 144 includes a top-down camera module 160 mounted in a top-down reader 162, a bottom camera module 164, a left-side low-profile camera module 166 and a right-side low-profile camera module 168 forming a bonnetless (i.e., inconspicuous) customer-side pair, and a left-side fruit-rail-seated camera module 170 and a right-side fruit-rail-seated camera module 174 that are also inconspicuous. The six camera modules, any of which may be optionally omitted, are collectively capable of establishing a six-sided read volume by which to capture image frames. Also, the form factor of camera modules may be varied to accommodate different mounting locations and preferences. For example, in another embodiment, the spherical form factor of the low-profile camera modules 166 and 168 may be replicated for the top-down camera module 160 (see e.g., FIGS. 8 and 9) to make it less conspicuous.

The expandable set of camera modules 144 are communicatively coupled to centralized decoding circuitry 150 through serial cabling 154. The term circuitry may refer to, be part of, or include an application-specific integrated circuit (ASIC), an electronic circuit, a processor (shared, dedicated, or group) or memory (shared, dedicated, or group) that executes one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The connection between the decoding circuitry 150 and camera modules 144 is serial differential signals, such as LVDS, MIPI CSI, or other serial interfaces, which provide for low cost since no additional conversion and drive circuitry are employed. As explained later with reference to FIGS. 13 and 14, the serial connections and centralized decoding circuitry 150 include multiple serial interfaces and multiple preprocessor-and-processor pairs. Thus, in contrast to decentralized processors integral to each camera module, processing resources of the optical code reader 100 are organized at a common location that may be placed meters away from the expandable set of camera modules 144.

In digital communications, a serial interface is a communication interface for communicating data as a series of voltage pulses down a wire. A "1" is represented by a high logical voltage, and a "0" is represented by a low logical voltage. In contrast to a parallel interface for communicating bits of a binary number based on their "spatial" location within a set of wires, a serial interface communicates the bits by their "temporal" location communicated over a wire. For example, in digital communications systems, a serial port is an embodiment of a serial interface through which information transfers in or out one bit at a time (in contrast to a parallel port). Integrated circuits (ICs), however, need not include various mechanical aspects of a port, so for purpose of this disclosure the term interface encompasses pins and electrical components of a hardware device (e.g., IC) used in digital communications. For example, a first IC includes a first interface, a second IC includes a second interface, and a connection for communications between the first and second ICs is electrically established through one or more wires (e.g., a cable or PCB conductors) extending between the first and second interfaces. Thus, in some embodiments, a serial or parallel connection includes at least two interfaces: a receiving interface and a transmitting interface to form the connection.

Figure 13:
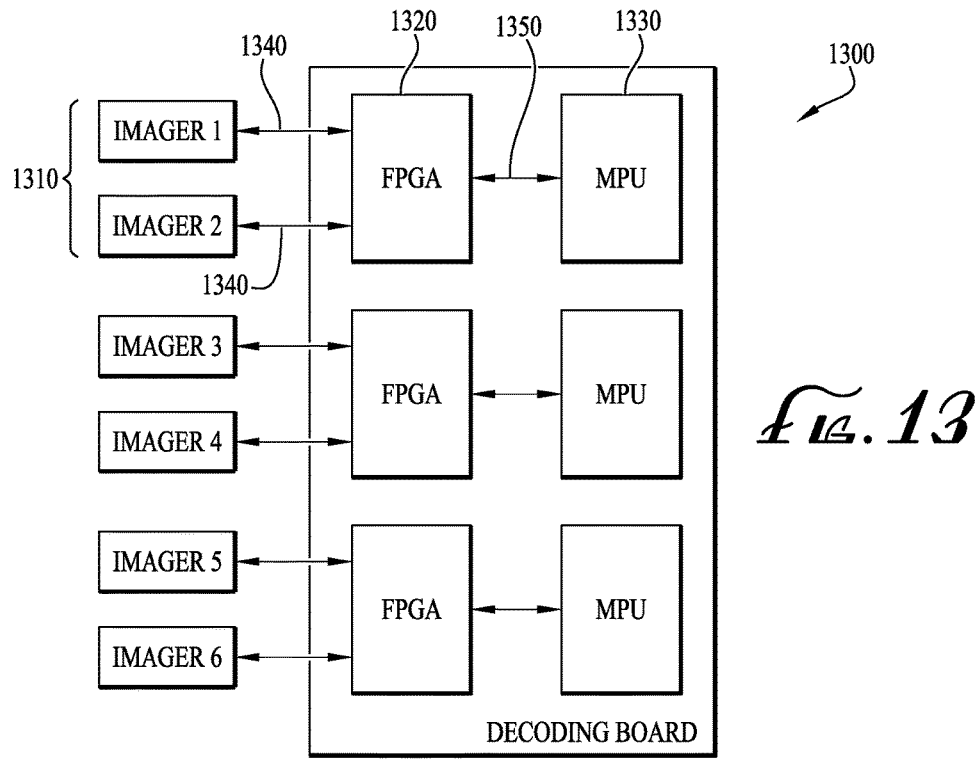
FIGS. 13 and 14 are block diagrams of two decoding circuitry embodiments employed for multiplexing and processing image data originating from up to six camera modules, in which the first embodiment of FIG. 13 includes a pair of FPGA and microprocessor unit (MPU) resources per each set of two camera modules, and the second embodiment of FIG. 14 includes a pair of FPGA and MPU resources per each set of three camera modules.
Figure 14:
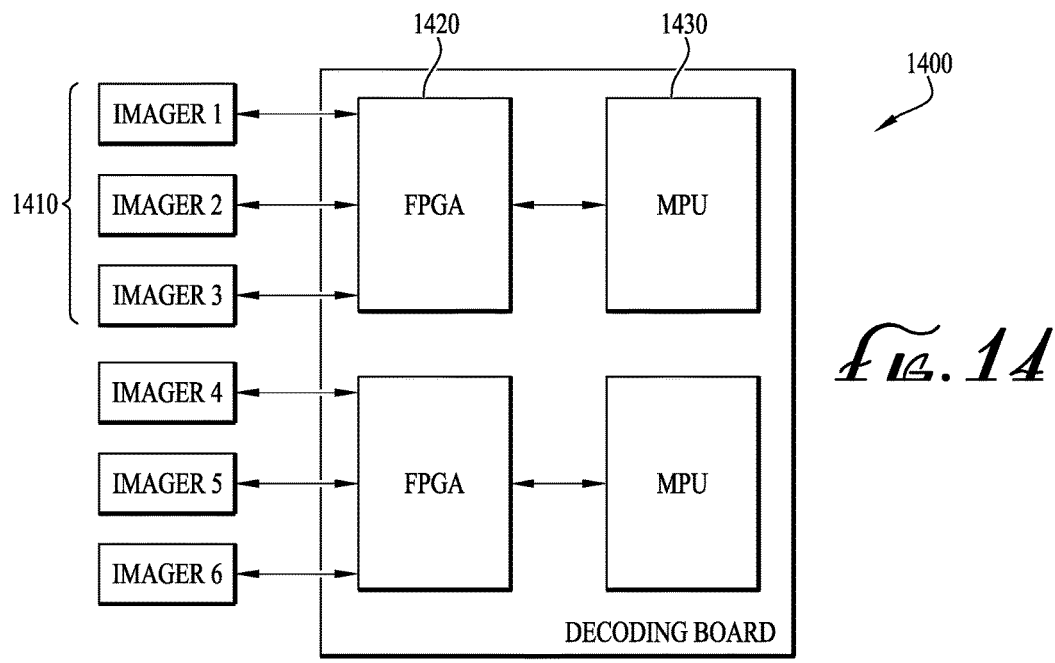

Image data is conveyed through the serial cabling 154 to the common, centralized decoding circuitry 150. In other words, camera modules each capture image frames and provide the image data through a serial connection with centralized decoder circuitry. The serial connection is established from a serial interface of a camera module, through an associated serial cable, to another serial interface of the centralized decoder circuitry. The centralized decoder circuitry, examples of which are shown in FIGS. 13 and 14, includes at least one FPGA (or other preprocessor) that multiplexes multiple serial image data streams into a parallel data stream provided to a decoder processor. The FPGAs also perform optional hardware-based decoder acceleration, among other things. For example, through item-detection sensors or the image data itself (e.g., image grayscale level, histogram, or local contrast information available directly from an image sensor or derived by a preprocessor), a processor can choose which image from multiplexed image data to process based on item location. This capability also reduces the processing load and, per force, the overall number of processors in an optical code reader.

Figure 3:
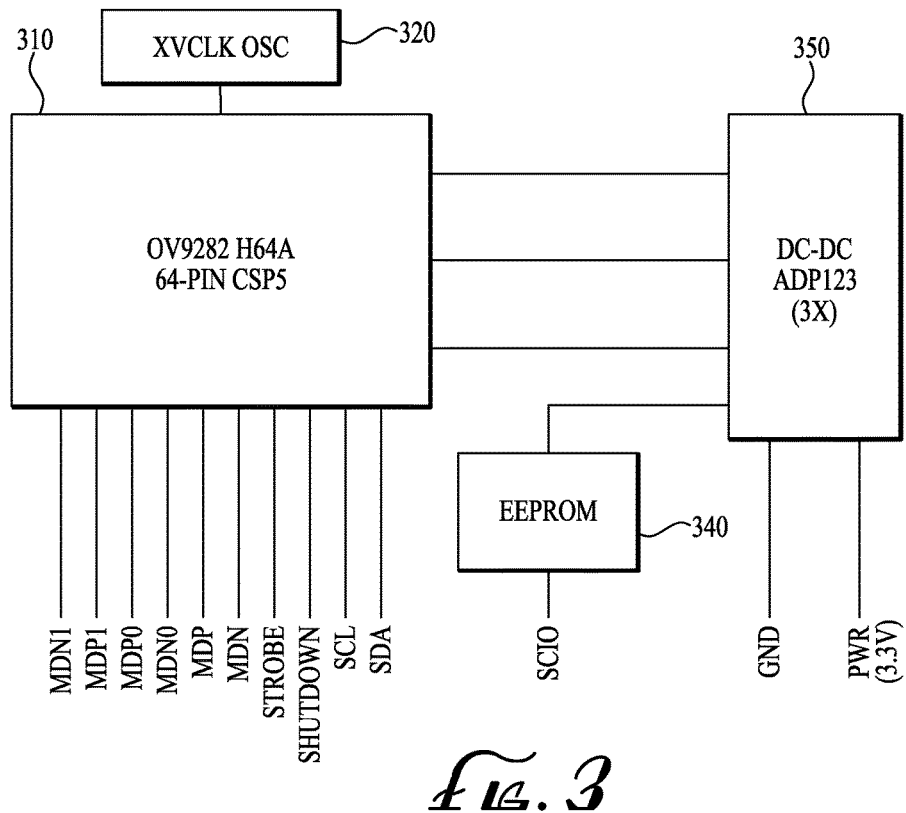
FIG. 3 is a block diagram of circuitry encompassed in a housing of a camera module shown in FIGS. 1 and 2.
Figure 2:
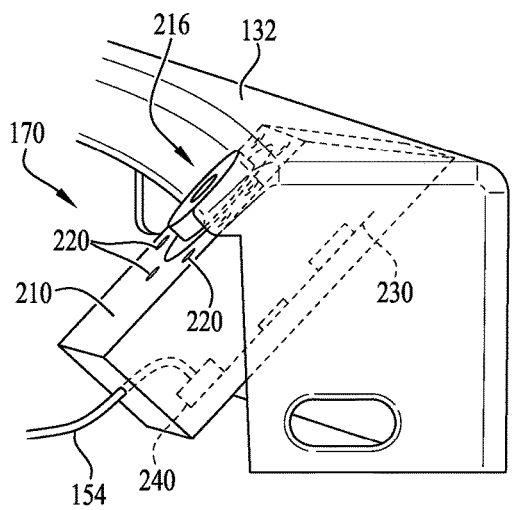
FIG. 2 is an enlarged isometric view of a fruit-rail camera module mountable in an area encompassed by line 2 of FIG. 1.
Figure 4:
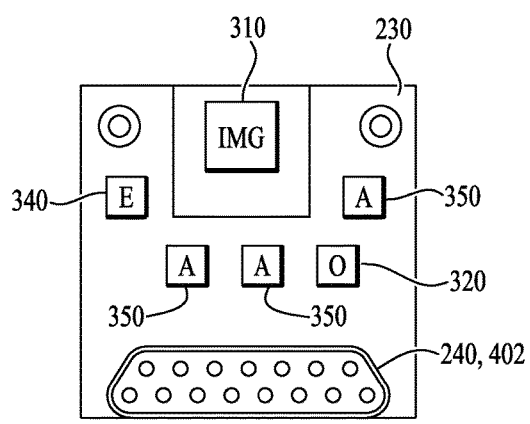
FIG. 4 is a top plan view showing in greater detail a one inch (2.54 cm) by one inch (2.54 cm) printed circuit board (PCB), including associated circuitry mounted thereon, of the camera modules shown in FIGS. 1 and 2.

FIGS. 2-4 show examples of mechanical and electrical circuitry implementation details of the left-side fruit-rail-seated camera module 170. For example, the left-side fruit-rail-seated camera module 170 includes a housing 210 encompassing optics 216, light-emitting diodes (LEDs) 220 circumferentially arranged about the optics 216, an imager PCB 230, an LED PCB (not shown), and a serial cable connector 240.

FIGS. 3 and 4 show components of the imager PCB 230. The components include an imager IC 310 available; a clock oscillator 320; an EEPROM 340 providing a non-transitory machine-readable medium for storing intrinsic calibration data or buffering image data associated with the imager IC 310; and low-dropout (LDO) voltage regulators 350. FIG. 4 also shows a 15-pin serial connector 402 that is electrically connected to serial interface pins (not shown) of the imager IC 310. According to some embodiments, each camera module includes components set forth in the following table.

TABLE

Imager and LED Board Components

| Part Type | Description of Example Component [Part Number] | Qty. |
|---|---|---|
| *Imager Board* | | |
| imager IC | 1280 × 800, 3 µm [OV09282-H64A] | 1 |
| lens assembly | customized design | 1 |
| serial EEPROM | Microchip 2 Kbit (256 × 8) with Single I/O, UNI/O ® Serial Interface Bus [11AA020] | 1 |
| passive circuitry | e.g., capacitors and resistors | 17 |
| LDO voltage regulator | 1-output [ADP123]; 2 outputs [MIC5392] | 3 |
| oscillator (6 to 27 MHz) | 6 MHz crystal oscillator | 1 |
| serial connector | 15 pin picoblade connector | 1 |
| serial cable | 20" (to decoder circuitry) | 1 |
| enclosure | plastic housing including window | 1 |
| screw | | 8 |
| PCB | 1" × 1", six layers | 1 |
| *LED Board* | | |
| LED | deep red or white LEDs | 6 |
| LED diffuser | Luminit light shaping diffuser (LDS) and lens | 1 |
| PCB | | 1 |

According to one embodiment, a camera module includes an OV9282 imager IC (or simply, the OV9282) available from OmniVision Technologies, Inc. of Santa Clara, Calif. The quarter-inch OV9282 is a high-speed global shutter image sensor that has one-megapixel resolution capable of capturing 1280×800 resolution images at 120 frames per second (fps) and Video Graphics Array (VGA) resolution at 180 fps output from two-lane CSI version 2 (CSI-2)—a specification of the MIPI Alliance—and digital video port (DVP) parallel output interface. Additional features of the OV9282 include ROI selection and context switching. This allows some of the camera settings to change dynamically as fast as alternating frames. The OV9282 is also available in both narrow and wide chief ray angle (CRA) settings including a CRA of 27 degrees. The OV9282 also features support for frame synchronization and dynamic defective pixel correction suitable for a wide range of consumer and industrial computer vision applications.

A camera module may be calibrated by an OEM, and the intrinsic parameters may be stored in the module, such as in additional non-volatile memory or one-time-programmable memory inside an image sensor or otherwise communicatively coupled to it. For example, parameters may be stored in the EEPROM 340 or other types of memory devices, including any combination of various levels of non-transitory machine-readable memory including, but not limited to, ROM having embedded software instructions (e.g., firmware), random access memory (e.g., DRAM), a cache, buffers, or other memory. In some embodiments, memory may be shared among the various processors or dedicated to particular processors. Likewise, extrinsic parameters (e.g., a rotation and translation matrix) may be calibrated in the factory or on-site and stored by the decoder circuitry or on each module. The stored accurate intrinsic parameters and stored or field calibrated extrinsic parameters can be used to reconstruct a three-dimensional model of an item observed in a read volume. And the three-dimensional information can be used for other reader functions such as autofocus, item-presence-detection in read volume, surface angle (relative to imager) calculation for skew correction, and other image acquisition and processing functions.

Figure 5:
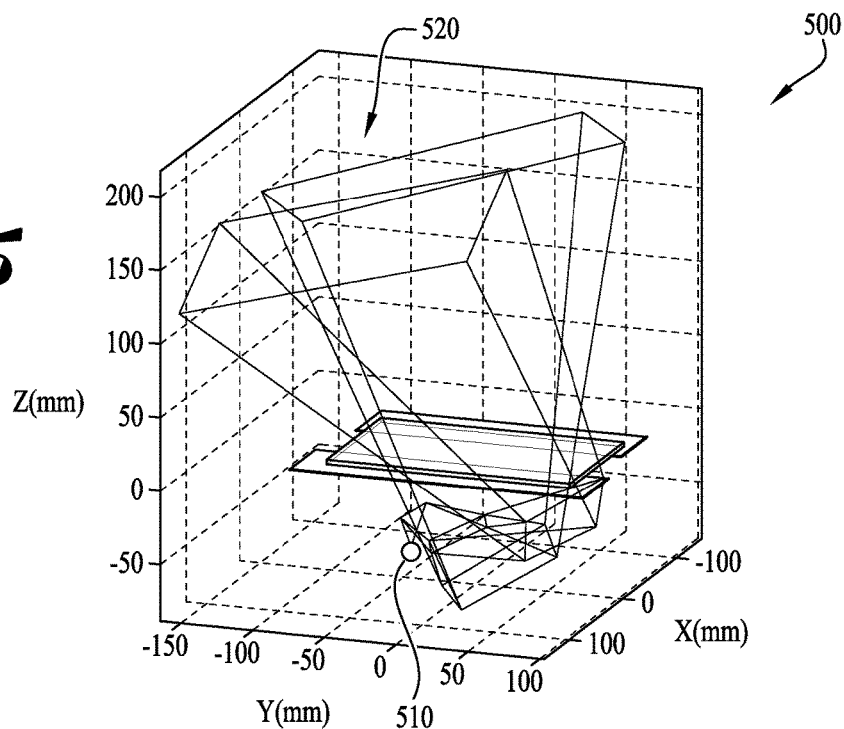
Figure 6:
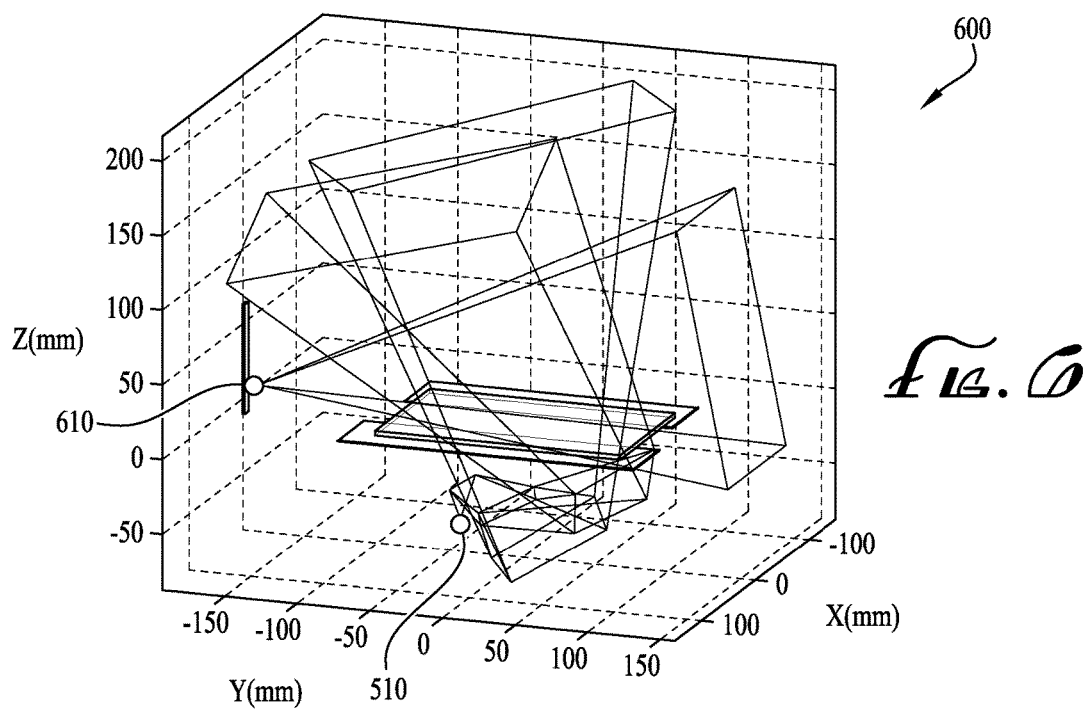
Figure 9:
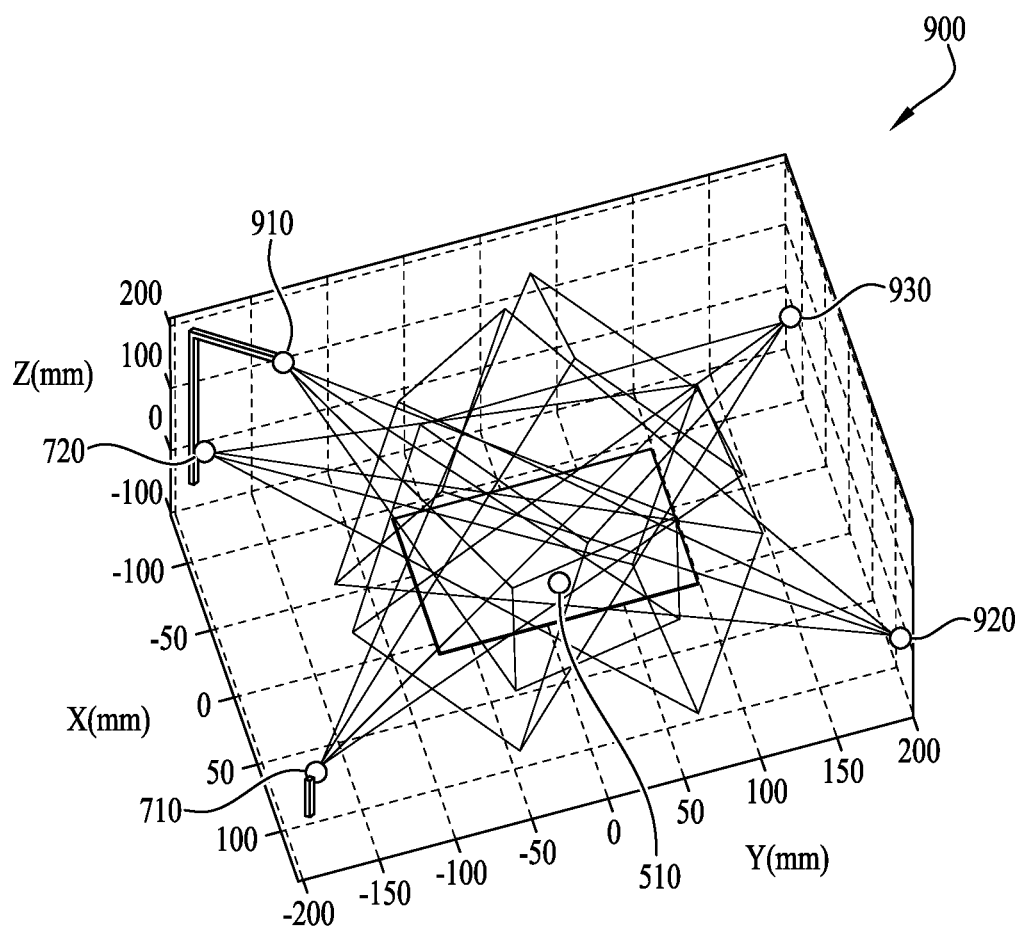

FIGS. 5-9 show different configurations that may be established by adding or removing camera modules to a common platform. For example, FIG. 5 shows a first configuration 500 having a horizontal (base) camera module 510 producing a split FOV 520. FIG. 6 shows a two-camera-module system 600 including the base camera module 510 and a vertical camera module 610 located at a relatively low can central position. FIG. 7 shows a three-camera-module system 700 that includes the base camera module 510, a left-side vertical camera module 710 and a right-side vertical camera module 720. FIG. 8 shows a four-camera-module system 800 including the base camera module 510, the left- and right-side vertical camera modules 710 and 720, and a central top-down reader camera module 810. FIG. 9 shows a full six-sided coverage system 900 including the following six camera modules: the base camera module 510, the left- and right-side vertical camera modules 710 and 720, a right-side top-down reader camera module 910, a left-side rear camera module 920, and a right-side rear camera module 930.

In another embodiment, FIGS. 10-12 show a conveyer-belt-based self-checkout system 1000 including six camera modules. The six camera modules include a pair of top-down modules 1010 above a conveyor belt 1016, a pair of left- and right-side input camera modules 1020 near an input tray 1026, and a pair of left- and right-side output camera modules 1030 near a payment station 1040.

Skilled persons will appreciate that other example platforms are included in the scope of this disclosure. For example, a portal scanner application such as the Jade X7 available from Datalogic USA, Inc. of Eugene, Oreg., may also include the camera modules described previously.

FIGS. 13 and 14 show block diagrams of the decoding circuitry 150 (FIG. 1) in the form of two example PCBs. In both examples, FPGAs provide for serial-to-parallel bridging, image data multiplexing (switching), and optional hardware acceleration. An advantage of having serial-to-parallel conversion, multiplexing, and hardware acceleration concentrated in an FPGA is low cost and processing efficiency.

In a first example 1300 of FIG. 13, data from two imagers 1310 are multiplexed by a preprocessor (FPGA) 1320 and provided to an associated processor (MPU) 1330. As explained previously, a serial connection 1340 between each imager 1310 and the FPGA 1320 is CSI-2. The FPGA then converts the serial data stream into a parallel stream communicated to the associated MPU 1330 via a parallel connection 1350.

For handling two images per FPGA, a suitable FPGA is a MachXO2 or MachXO3, which includes a so-called "MIPI CSI2-to-CMOS Parallel Sensor Bridge" interface for facilitating the parallel connection 1350. The MachXO2 and MachXO3 FPGAs are available from Lattice Semiconductor Corporation of Portland, Oreg.

Likewise, for handling two imagers per MPU, a suitable MPU is an i.MX 7 processor operating at a maximum Pixel Clock (Pclk) of greater than 80 MHz. The i.MX 7 also includes a parallel CMOS Sensor Interface (CSI) for facilitating the parallel connection 1350. The i.MX 7 is available from NXP Semiconductors N.V. of Eindhoven, Netherlands.

In this example 1300, each imager at 40 fps has a data rate of about 40 MB/s per imager (1280*800*40), so two imagers 1310 yield about 80 MB/s of image data per MPU. A system having three MPUs, therefore, accommodates 240 MB/s. This represents a significant increase over a three-imager Magellan 9800i, which is capable of 157 MB/s (3*1280*1024*40) per system, or 52.4 MB/s (1280*1024*40) per each imager—decoder pair, but nevertheless lacks a hardware acceleration capability since each imager is directly coupled to its decoder (i.e., an AM3703 processor available from Texas Instruments Inc. of Dallas, Tex.). In other words, previous products had one imager connected to one decoder processor such that the processor could not be used efficiently when an interesting feature (such as a barcode, watermark, or other decodable or recognizable item) was available in an image data stream from another imager.

In the second example 1400 of FIG. 14, data from three imagers 1410 are multiplexed by a preprocessor (FPGA) 1420 to one processor (MPU) 1430. For three imagers per FPGA running at 120 fps clock speed to interleave image data of the imagers, an ECP3 (or higher) FPGA available from Lattice Semiconductor Corporation is a suitable choice as a preprocessor. The MPU 1430 in this example is also an i.MX 7, but operating at Pclk speeds greater than 120 MHz.

FIGS. 15 and 16 are example timing diagrams showing how a preprocessor multiplexes image data from, respectively, two and three imagers. Each image frame is shown at a discrete, non-overlapping time on a timeline. In practice, however, a preprocessor may control exposure at overlapping times when it synchronizes multiple camera modules. Thus, in some embodiments, camera modules have substantially simultaneous exposure and image data timing such that the FPGA buffers image frames before communicating them to an associated processor. For example, any two cameras having overlapping FOVs may be used for 3-D reconstruction when two imagers are simultaneously exposed or exposed with a sufficiently small gap in time (e.g., 100 μs) such that the 3-D reconstruction remains valid. In other words, any two camera modules may be configured for 3-D reconstruction, and a stereo pair of camera modules (e.g., vertical left and right) may be used to derive 3-D position or other coordinate information. Imager exposure synchronization can be controlled by the FPGA so that it can meet different data processing requirements.

In a first timing example 1500, FIG. 15 shows that image data from two imagers is multiplexed to one processor. The frame rate in this example is 30 fps to allow additional processing time for each image frame. The imager frame rate, however, may be lower or higher depending on the optical coverage.

In a second timing example 1600, FIG. 16 shows that image data from three imagers is multiplexed to one processor. In this example, each imager operates at 40 fps.

FIGS. 15 and 16 both indicate that each image frame is eventually multiplex. In other embodiments, an FPGA determines whether to send image frames (or portions thereof) to a processor. Thus, FPGAs may be configured to minimize processor loads. For example, an FPGA may preprocess images and find which image has an item in it, and only send that image to a processor for decoding. The FPGA may determine which images to send based on hardware acceleration scores; i.e., images are preprocessed and ROIs are assigned a score indicating the likelihood that they have relevant data. U.S. Patent Application Publication No. 2016/0350569 A1, which is a publication of a patent application owned by the present applicant, provides examples of ROI detection and processing techniques suitable for implementation as hardware acceleration tasks performed by preprocessors of the present disclosure. In another example, U.S. Pat. No. 8,632,011, which is also owned by the present applicant, describes techniques for generating image data histograms indicting whether an item is present in an image frame. These so-called histogram techniques are also suitable for hardware acceleration (e.g., rejecting image frames that have no item).

In other embodiments, image data streams of one processor may be provided to multiple pairs of preprocessor-and-processor resources. For example, an image frame of one imager is provided to a first pair for decoding 1-D and 2-D barcodes, and it is also provided to another pair for performing ViPR object recognition using scale-invariant feature transform (SIFT) techniques. Depending on the number of processors or different types of processor loads, the optical code reader may support the following decoding capabilities: barcode (1- and 2-D) decoding; barcode and digital watermark (DWM) (also known as Digimarc Barcode) decoding; barcode, DWM, and image transfer (i.e., use the camera module as an image capture device, captured image may be compressed, distortion corrected and then transferred to the processor for further processing or visual purpose); barcode, DWM, and ViPR; or barcode, DWM, ViPR, and 3-D processing such as 3-D point cloud from a stereo pair of imagers.

Skilled persons will appreciate that many changes may be made to the details of the above-described embodiments without departing from the underlying principles of the invention. Moreover, various aspects of certain embodiments may be implemented using hardware, software, firmware, or a combination thereof. Decoding circuitry, for example, may refer to, be part of, or include an ASIC, electronic circuitry, a processor (shared, dedicated, or group) or memory (shared, dedicated or group) that executes one or more software or firmware programs, a combinational logic circuit, or other suitable components that provide the described functionality. A software module, component, or the aforementioned programmable rules may include any type of computer instruction or computer-executable code located within or on a non-transitory computer-readable storage medium. These instructions may, for instance, comprise one or more physical or logical blocks of computer instructions, which may be organized as a routine, program, object, component, data structure, text file, or other instruction set, which facilitates one or more tasks or implements particular abstract data types. In certain embodiments, a particular software module, component, or programmable rule may comprise disparate instructions stored in different locations of a computer-readable storage medium, which together implement the described functionality. Indeed, a software module, component, or programmable rule may comprise a single instruction or many instructions, and may be distributed over several different code segments, among different programs, and across several computer-readable storage media. Some embodiments may be practiced in a distributed computing environment where tasks (e.g., adjunct processing) are performed by a remote processing device linked through a communications network. The scope of the present invention should, therefore, be determined only by the following claims.

The invention claimed is:

1. An optical code reader, comprising:
centralized decoding circuitry communicatively couplable to an expandable set of camera modules placed at spaced-apart locations of the optical code reader, a number of and locations for members of the expandable set of camera modules establishing application-specific and scalable read zone coverage formed from multiple fields of view of the members, the centralized decoding circuitry having multiple serial interfaces and a preprocessor-and-processor pair;
a first camera module of the expandable set of camera modules having a first imager and a first serial interface for communicating first image data generated by the first imager according to a first data rate, the first serial interface being integral to the first imager;
a second camera module of the expandable set of camera modules, spaced apart from the first camera module, having a second imager and a second serial interface for communicating second image data generated by the second imager according to the first data rate, the second serial interface being integral to the second imager;
the preprocessor-and-processor pair including a preprocessor providing a serial-to-parallel multiplexer of the pair, a processor providing an optical code decoder of the pair, a first set of serial interfaces of the serial-to-parallel multiplexer, and a second set of parallel interfaces;
the first set of serial interfaces including third and fourth serial interfaces, the third serial interface serially couplable through a first corresponding serial cable to the first serial interface of the first camera module, and the fourth serial interface serially couplable through a second corresponding serial cable to the second serial interface of the second camera module; and
the second set of parallel interfaces including a first parallel interface of the serial-to-parallel multiplexer and a second parallel interface of the optical code decoder, the first and second parallel interfaces communicatively coupled to each other for communicating, at a second data rate different from the first data rate, multiplexed image data generated from the first and second image data by the serial-to-parallel multiplexer for conveying the multiplexed image data to the optical code decoder and thereby facilitating an attempt of the optical code decoder to decode an optical code borne by an item present within the read zone coverage and represented in one or both of the first and second image data.

2. The optical code reader of claim 1, in which the preprocessor comprises a field-programmable gate array (FPGA).

3. The optical code reader of claim 1, in which the first and second image data are image frames generated by, respectively, the first and second camera modules operative at a frame rate corresponding to the first data rate.

4. The optical code reader of claim 1, in which the first set of serial interfaces includes two or more serial interfaces.

5. The optical code reader of claim 1, further comprising three or more camera modules.

6. The optical code reader of claim 1, in which the preprocessor is configured to analyze the first and second image data for presence or absence of the item.

7. The optical code reader of claim 6, in which the preprocessor is configured to suppress from inclusion in the multiplexed image data at least some portion of the first or second image data.

8. The optical code reader of claim 6, in which the preprocessor is configured to analyze the first and second image data for presence or absence of a region of interest (ROI) having characteristics indicating presence or absence of at least a portion of the optical code.

9. The optical code reader of claim 8, in which the preprocessor is configured to suppress from inclusion in the multiplexed image data at least a portion of the first or second image data lacking the ROI.

10. The optical code reader of claim 1, in which the first, second, third, and fourth serial interfaces comprise Camera Serial Interfaces (CSIs).

11. The optical code reader of claim 1, in which the preprocessor is configured to control image-exposure synchronization between the first and second camera modules.

12. The optical code reader of claim 11, in which the image-exposure synchronization facilitates substantially simultaneous exposure for generation of three-dimensional (3-D) spatial data of the item.

13. The optical code reader of claim 12, in which the centralized decoding circuitry is configured to determine a 3-D location of a feature of the item based on the 3-D spatial data.

14. A method of configuring an optical code reader platform for application-specific scalability of a read zone formed from one or more fields of view of camera modules mountable at spaced-apart locations of the optical code reader platform, the method comprising:
arranging, based on desired coverage of the read zone, members of a set of camera modules at corresponding spaced-apart locations of the optical code reader platform that are predefined for establishing the one or more fields of view forming the desired coverage of the read zone, each member of the set having an imager including an integral serial interface for communicating image frames from an associated member of the set;
providing centralized decoding circuitry including multiple preprocessor-and-processor pairs, each preprocessor of one of the pairs including serial interfaces serially couplable through corresponding serial cabling to corresponding serial interfaces of, respectively, first and second members of the set of camera modules, and each preprocessor of one of the pairs having a parallel interface for a corresponding processor of the one of the pairs such that the preprocessor multiplexes first and second image data from, respectively, the first and second members and presents multiplexed image data to the corresponding processor configured to attempt to read an optical code represented in one or both of the first and second image data; and
communicatively coupling, through the serial cabling, the serial interfaces to establish the application-specific scalability of the optical code reader platform.

15. The method of claim 14, further comprising calibrating intrinsic and extrinsic calibration parameters of the members of the set of camera modules to establish at least one stereo pair of camera modules.

16. The method of claim 14, in which the communicatively coupling comprises coupling two or more camera modules to each preprocessor.

17. The method of claim 14, in which the arranging comprises seating at least one camera module in a fruit rail of an optical code reader.

18. The method of claim 14, in which the arranging comprises mounting six camera modules.

19. The method of claim 14, further comprising providing between the preprocessor and the processor a parallel electrical connection that is about 10 millimeters or less in length.

* * * * *